Figure 1:
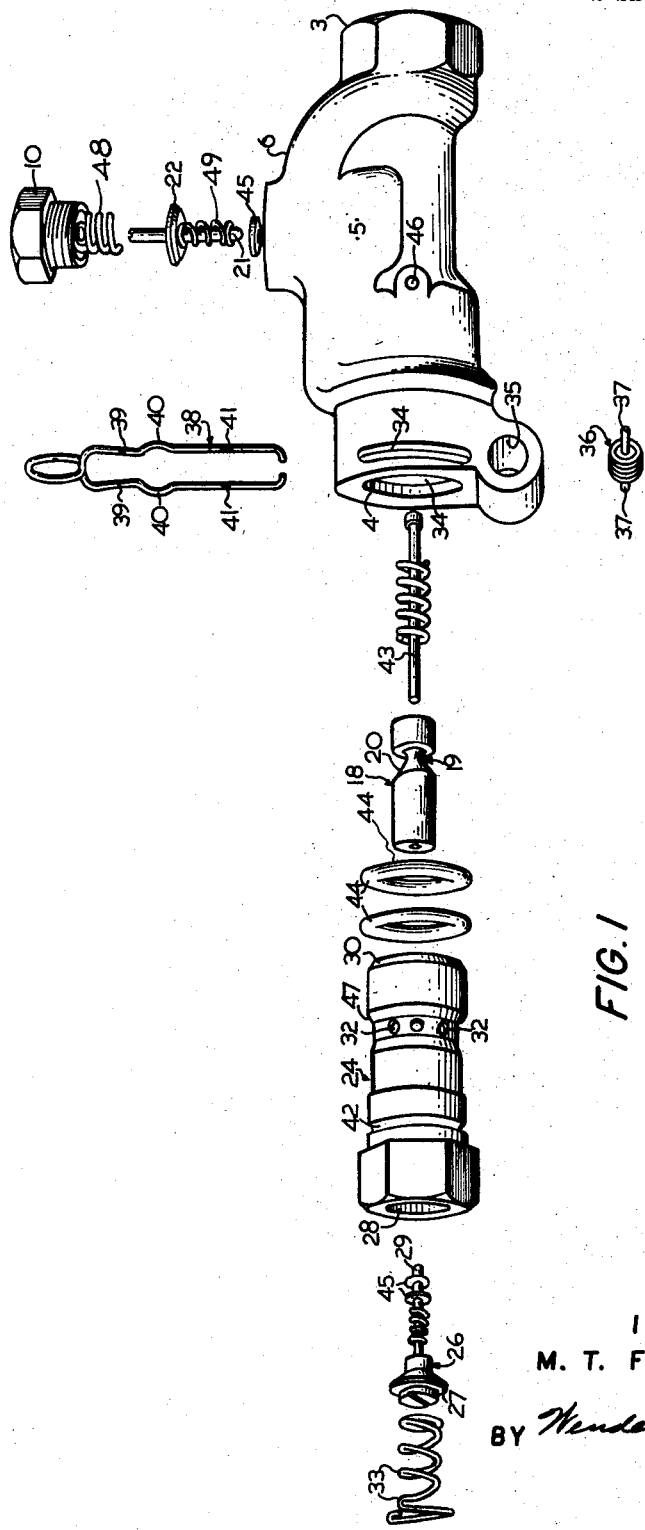

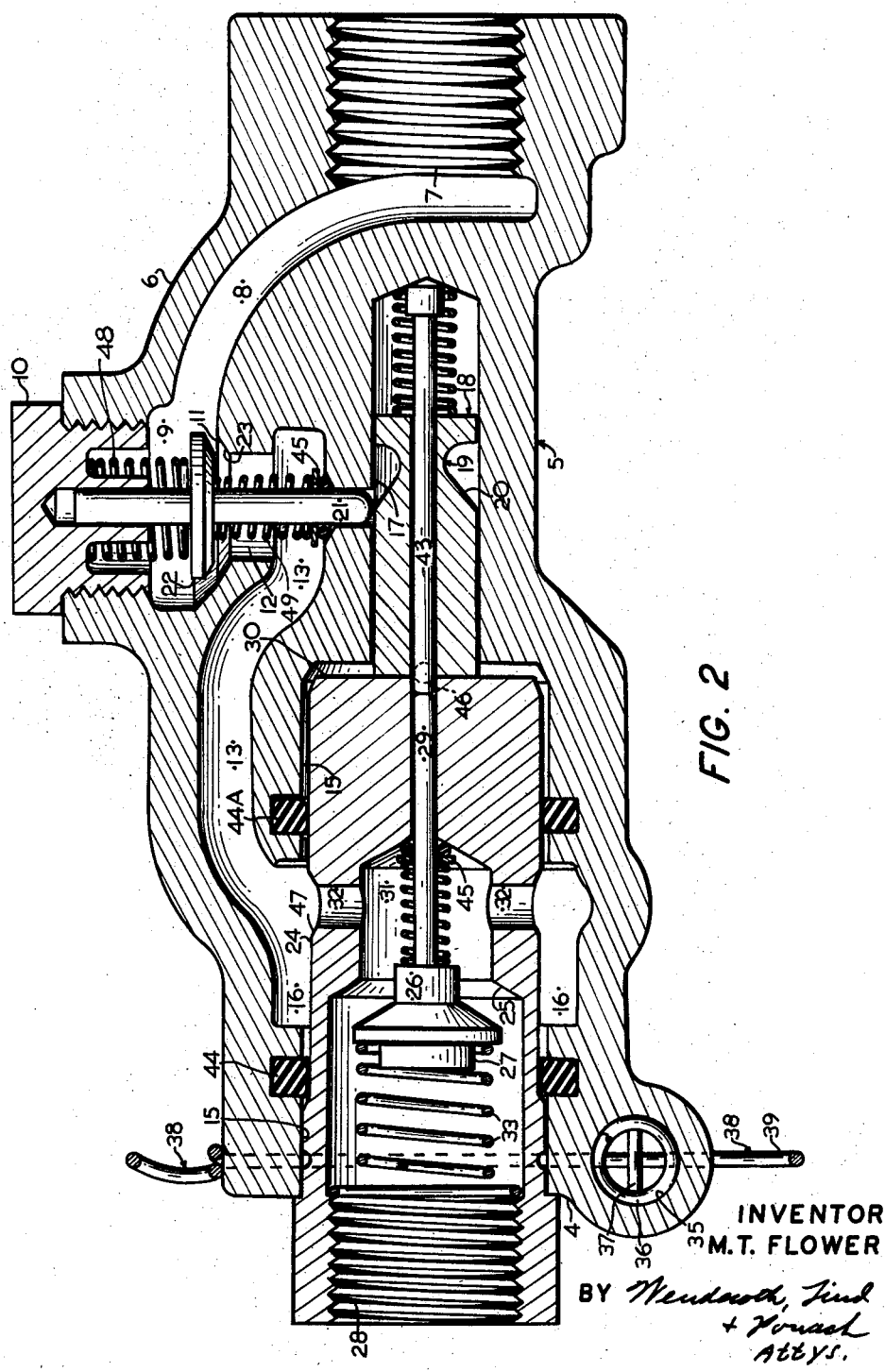

United States Patent Office 2,893,755
Patented July 7, 1959

2,893,755

QUICK RELEASE HOSE COUPLING

Malcolm Thomas Flower, Sydney, New South Wales, Australia, assignor to Hedley Ward Alderson, Balgowlah, New South Wales, Australia Application November 26, 1956, Serial No. 624,294

Claims priority, application Australia December 20, 1955

3 Claims. (Cl. 284—18)

This invention relates to quick release hose couplings of the type that are adapted to be disconnected by accident or intention.

Such couplings are known but hitherto have suffered from serious defects which have restricted their use in many applications.

For example they cannot be used as an accidental breakaway coupling unless their installation is supplemented by additional and costly equipment such as extra flexible hoses and special brackets, as well as the necessary pipe connecting fittings that the use of the foregoing entails.

The main object of the present invention is to provide a quick release hose coupling which substantially eliminates these disadvantages.

Another object of the invention is to provide a quick release hose coupling that can be attached directly to a source of fluid pressure supply on a machine or pressure vessel.

A further object of the invention is to provide a quick release coupling that is adapted for connection between two lengths of pressure hose line.

In a general form, the invention is for a quick release hose coupling comprising a body having an inlet and an outlet port remotely spaced, the said ports being connected by a first passage, a first valve adapted to interrupt the first passage, means for actuating the first valve, a displaceable plug slidable in one of the said ports and having a second passage through it forming part of the said first passage, a second valve adapted to interrupt the passage in the plug, means for actuating the second valve, and means for releasably securing the plug in its port, the plug being adapted to open the first valve when retained in its port, and the first and second valves being adapted to close when the plug is partly withdrawn from the coupling.

For a better understanding of the invention reference is made to the following description wherein an exemplary embodiment of the invention is represented.

The exemplary embodiment is illustrated in the accompanying drawings in which

Fig. 1 is an exploded perspective view of the device showing the various associated components, Fig. 2 is an elevation in half section of the device shown in the fully assembled condition.

Accordingly, in the practice of this invention use is made of a body member 5 which in side elevation approximates the shape of an arch 6 joined at its base by a straight line which is the axis of the inlet and outlet ports 3 and 4 of the coupling.

The inlet port 3 enters the body 5 for a short distance and is provided with an internal screw thread for the connection of a fluid supply conduit. From the innermost end 7 of the said port 3 a first passage 8 communicates with a cavity 9 situated in the upper part of the body arch 6 access to the cavity being by way of a screwed plug 10 radially located in the top of the arch 6. The said first passage 8 enters the cavity 9 from the side, and the floor 11 of the cavity is apertured to form a second passage 12 communicating with a third passage 13 leading to the bore 15 of the outlet port 4, where it connects with an annular groove 16 in the bore 15 of the said port 4.

The bore 15 of the outlet port 4 is of substantial diameter and at its inner end the bore is continued coaxially at a reduced diameter to form a cylinder 17 in which a plunger-cam 18 is slidably disposed. The plunger-cam 18 is an elongated member of circular cross section which is provided with a circumferential groove 19 of conical shape in longitudinal section, the inclined face of which forms a cam track 20.

The cam track 20 coacts with the stem 21 of a first poppet valve 22 the seating 23 for which is disposed in the floor 11 of the cavity 9 entered by the first passage 8, the arrangement being such that when the plunger-cam 18 is depressed the valve stem 21 will be displaced by the cam track 20 and the valve 22 displaced from its seating thereby.

The valve 22 is resiliently biassed by spring 48 in the direction of its seating 23 and the plunger-cam 18 is resiliently biassed by spring 49 so that when it is not restrained it will be displaced to allow the valve 22 to close on its seating 23.

The plunger-cam 18 is actuated by a plug 24 which is rotatable and slidably displaceable in the bore 15 of the outlet port 4 of the body member 5.

This plug 24 is bored to form a seating 25 for a second poppet valve 26 the head 27 of which is spaced from the outlet end 28 of the plug 24 and is disposed with its stem 29 passing through but not far beyond the wall 30 at the inner end of the plug when the said valve 26 is seated.

Between the second valve seating 25 and the end wall 30 of the plug 24 a chamber 31 is provided which is entered by a plurality of spaced radial holes 32 in the tubular wall of the plug 24. In the operable position the said radial holes 32 register with the annular groove 16 connecting the third passage 13 with the bore 15 of the outlet port 4.

The second poppet valve 26 is resiliently urged on to its seating by a spring 33 and for a short distance the bore 28 of the plug 24 is screw-threaded for the connection of a conduit.

Adjacent to its outer end the oulet port 4 of the body 5 has two approximately quarter circumferential, diametrically opposite slots 34. Immediately below the slots a transverse bore 35 is provided in body 5 to accommodate a tension spring 36. The spring 36 is provided with eyelets 37 which project from each end of the bore 35. A spring wire circlip 38 having two elongated legs 39 is adapted to engage the slots 34, one leg 39 being located in each slot 34, and also passing through one of the eyelets 37 in the spring 36. The circlip is capable of a degree of displacement with respect to the slots 34 so that either a radiused section 40, or a straight section 41 of the legs 39 can be brought into register with the bore 15 of the outlet port 4, and the plug 24 has a matching circumferential groove 42 for engagement by the said circlip legs 39.

The stem 29 of the second poppet valve 26 is of less diameter than the plunger-cam 18 and it may now be seen that when the plug 24 is operably entered into the outlet port 4 of the body 5 it will be displaceably retained by the said circlip 38 and the inner end 30 of the plug 24 will abut with and depress the plunger-cam 18 which thereupon causes the first poppet valve 22 to be raised from its seating 23. As the plunger-cam 18 is depressed it slides over a coaxial rod 43 which thereupon abuts with the end of the stem 29 of the second poppet valve 26 which is thereby raised from its seating 25.

With the respective parts in their operable positions as described there is an unobstructed passage between the inlet port 3 via the first passage 8, past the first poppet valve 22 via the second and third passages 12 and 13, then through the radial holes 32, in the plug 24, then past the second poppet valve 26 and the plug outlet 28.

If the coupling is now released by the plug 24 being pulled out of the body member 5, the plunger-cam 18 moves endwise outwardly, allowing the first poppet valve 22 to resume its seating thus closing communication beyond the first passage 8.

Concurrently, the outward movement of the plug 24, moves the second poppet valve 26 away from its actuating rod 43. The said valve 26 thereupon resumes its seating 25, thus sealing the plug 24 and preventing any back-flow from any pipe line connected thereto.

In order to facilitate insertion of the plug 24 into the body 5, the circlip 38 is moved in the slots 34 so that the radiused sections 40 of the legs 39 register with the body bore 15. When the plug 24 is fully home the circlip 38 is moved so that the straight sections 41 of the legs 39 engage the groove 42 in the plug. The plug 24 will now be retained in body 5 by the action of the circlip 38, assisted by the spring 36. However an excessive stress on the conduit attached to said plug will cause it to come free from the body even with the circlip in the position just described. The conduit and plug are thus protected from excessive strain.

It will be readily understood that plug 24 is provided with sealing rings 44 and 44A accommodated in annular grooves suitably disposed in the body member 5 and that sealing rings 45 are provided to effect substantially fluid tight junctions wherever such rings are necessary.

At the same time a pressure leakage hole 46 is suitably located for drainage of fluid that may leak past the said seal 44A or 45 into any pocket.

From the construction of the quick release hose coupling herein described by way of example, it will be apparent that when the coupling is used with fluid under pressure, the coupling is pressure balanced. By this is mean that the components of the coupling, when in their operable positions and subjected to pressure of the fluid supply, there is no internal force tending to displace the plug 24 from the body 5.

Due to the accommodation of the second poppet valve 26 within the displaceable plug 24 there is a small pressure differential which represents the end area of the valve stem 29.

Compensation for this difference is made by slightly reducing the outside diameter of the plug 24 for a part of its length extending towards its open end from a circumferential groove 47 to a short distance beyond the sealing ring 44.

The groove 47 is provided to prevent damage to the sealing ring 44 when the plug is removed from or entered into the body 5.

The different diameters of the plug arranged as described provide the face of the groove 47 with a greater projected area at its inner end than the projected area of the opposite face of the groove.

In normal operation the said difference in area causes the plug to be slightly biassed inwardly in the body 5, when the coupling is under liquid pressure.

What I claim is:

1. A quick release hose coupling comprising a body having a first passage extending through it having inlet and outlet ports near the respective ends of said first passage, a first valve and valve seat means in said first passage spaced from each end of said first passage, first valve biasing means biasing said first valve toward a position closing said first passage, one of said ports being a cylindrical bore, a plug slidable in said bore and having a second passage formed therethrough, said second passage connected to said first passage, a second valve and valve seat means in said second passage in said plug, second valve biaing means biasing said second valve toward a position closing said second passage, first valve actuating means slidable in said body and displaceable by said plug and contacting said first valve for holding said first valve open against a closing bias, and second valve actuating means slidable in said plug for holding said second valve open against a closing bias when said plug is fully inserted in said bore, third means on said body and engaging said plug for detachably retaining said plug in said bore in the fully inserted positon, and fourth means in siad body and bearing on said first valve actuating means for displacing said first valve actuating means from its position holding said first valve open when said plug is partly withdrawn from said bore, said first and second valve biasing means actuating said first and second valves to close said first and second passages when said plug is partly withdrawn from said bore.

2. A coupling as claimed in claim 1 in which said first valve actuating means comprises a plunger, said body having a recess at the inner end of said bore in which said recess said plunger is slidable, said plunger being engaged by said plug and being displaced when said plug is fully inserted in said bore, said body having a third passage therein between said recess and said first passage, said first valve having a stem slidably located in said third passage, said plunger having a circumferential groove therein for receiving one end of said valve stem of said first valve when said plug is partly withdrawn from said bore and said plunger is displaced by said fourth means so that said first valve seats on its seat means, said groove having an inclined face, whereby when said plunger is displaced into said recess by said plug said valve stem of said first valve is displaced to raise said first valve off its seat.

3. A coupling as claimed in claim 2 in which said second passage in said plug has an outer part and a reduced diameter inner part, said second valve seat means being at the point where said outer part and inner part meet, said plug having transverse passages therein connecting said inner part with said first passage, said plug having an axial passage through it from said inner part, said second valve having a stem slidably located in said axial passage, and said second actuating means comprising a rod, said plunger having an axial plunger bore therein in alignment with said axial passage in which said rod is slidable, whereby when said plug is fully inserted in said bore said rod engages said second valve stem to raise said second valve off its seat.

References Cited in the file of this patent
UNITED STATES PATENTS

| | | |
|---|---|---|
| 221,153 | Chapin | Nov. 4, 1879 |
| 2,327,611 | Scheiwer | Aug. 24, 1943 |
| 2,433,119 | Hansen | Dec. 23, 1947 |
| 2,478,052 | Palm | Aug. 2, 1949 |
| 2,619,367 | Hanson | Nov. 25, 1952 |
| 2,742,052 | McKee | Apr. 17, 1956 |
| 2,772,898 | Seeler | Dec. 4, 1956 |

FOREIGN PATENTS

| | | |
|---|---|---|
| 1,080,178 | France | May 26, 1954 |